(No Model.)

M. MACDONALD.
JOINT MARKING AND DRESSING TOOL FOR CEMENT PAVEMENTS.

No. 334,125. Patented Jan. 12, 1886.

Witnesses,
J. H. Howse.
H. C. Lee.

Inventor,
M. Macdonald
By Dewey &
Attorneys

UNITED STATES PATENT OFFICE.

MALCOM MACDONALD, OF OAKLAND, CALIFORNIA.

JOINT MARKING AND DRESSING TOOL FOR CEMENT PAVEMENTS.

SPECIFICATION forming part of Letters Patent No. 334,125, dated January 12, 1886.

Application filed August 26, 1885. Serial No. 175,395. (No model.)

*To all whom it may concern:*

Be it known that I, MALCOM MACDONALD, of the city of Oakland, county of Alameda, and State of California, have invented an Improvement in Joint Marking and Dressing Tools for Cement Pavements; and I hereby declare the following to be a full, clear, and exact description thereof.

My invention relates to a new and useful tool or implement for marking and dressing the joints of cement or artificial-stone surfaces or pavements; and my invention consists of a suitably-handled tool having a peculiar central cutting or indenting rib or blade and a laterally or transversely concaved surface or face on each side of said rib or blade, the whole face of the tool being rounded or convexed in the direction of its length.

It consists, further, in the particular construction of the tool, as I shall hereinafter fully explain.

The object of my invention is to provide a tool which is adapted to readily form the division-joints, leaving them with rounding or convex sides and edges, and adapted also to dress or polish the surfaces of the joints and the surfaces contiguous thereto.

Figure 1:
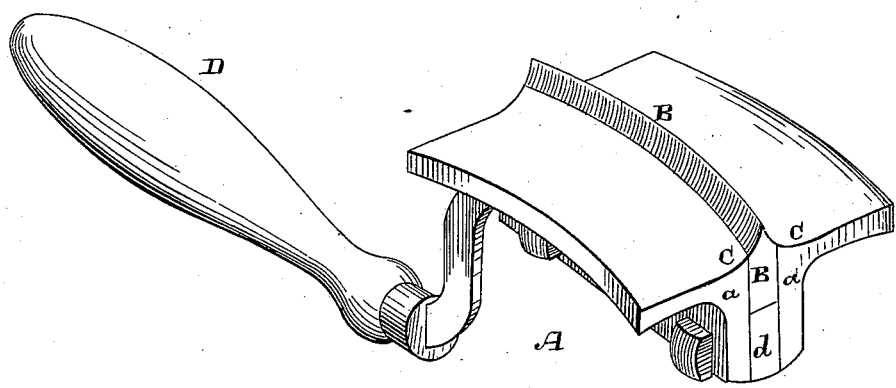
Figure 2:
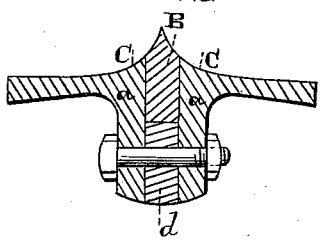

Referring to the accompanying drawings, Figure 1 is a perspective view of the tool or implement, and Fig. 2 is a cross-section at one of the clamping-bolts.

The tool or implement A has a knife, blade, or rib, B, arranged on the central longitudinal line of its face. This blade has the edge or face V-shaped in cross-section, the sides of the edge being preferably concave. The surface or face of the tool on each side of the blade is laterally or transversely concaved, as shown at C. The whole face of the tool, including the rib or blade and the surfaces on each side, is rounded or convexed in the direction of its length.

The tool is preferably made in the following manner: Two angled pieces, *a*, receive and have bolted between them the shank *d* of the handle D, and also receive between them the body of the blade or rib B, which is clamped therein by the bolts securing the shank.

The operation of the tool is as follows: It is passed back and forth over the cement while still in a plastic condition, being guided by a straight-edge or other similar device. The blade or rib B cuts into the cement, forming the joint, and giving to its sides a convexity by reason of its own concave sides, and the concave surfaces C on each side of the rib or blade give to the edges and surfaces adjacent to the joint a convexity also, which merges into or continues that of the sides of the joint. The continued movement of the tool back and forth dresses and polishes the surface of the stone. The joints of cement pavements are usually made by hand with a trowel, and it is generally intended to leave a rounding edge; but this operation requires much time, and is at best imperfect. My implement, on the contrary, does the work quickly and perfectly. The object in leaving the rounded surface or edge is to prevent cracking and breaking off when walked on.

I am aware that a stamping-tool is in use which makes a joint with a knife or rib; but this stamp is essentially different from mine in several particulars. In the first place it leaves the edges of the joint perfectly square, so that they have a tendency to and they do chip and break off, and in the next place, being a mere stamp, it does not dress or polish the cement, but leaves it rough and unfinished. The face of my implement, being rounded or convexed lengthwise, enables it to pass over the surface smoothly, avoiding interference of its front or back edges.

Having thus described my invention, what I claim as new, and desire to secure by Letters Patent, is—

1. A tool or implement for marking and dressing the joints of cement pavements and surfaces, having on its face a cutting blade or rib for making the indentation or joint, and laterally-concaved surfaces on its face on each side of and adjoining the blade or rib for rounding or convexing the edges and adjacent surfaces of the joint, substantially as herein described.

2. A tool or implement for marking and dressing the joints of cement pavements and surfaces, having on its face a V-shaped cutting blade or rib with concave sides for making the indentation or joint and convexing its sides, and laterally-concaved surfaces on its face on each side of and adjoining the blade or rib, and continuing the curvature of its sides, for rounding or convexing the edges and adjacent surfaces of the joint, substantially as herein described.

3. A tool or implement for marking and dressing the joints of cement pavements, having a rubbing-face and a cutting blade or rib thereon for the joints, the face and rib being rounded or convexed in the direction of its length, substantially as described.

4. A tool or implement for marking and dressing the joints of cement pavements and surfaces, having on its face a cutting blade or rib with concave sides for making the indentation or joint and convexing its sides, and laterally-concaved surfaces on its face on each side of and adjoining the blade or rib, and continuing the curvature of its sides, for rounding or convexing the edges and adjacent surfaces of the joint, the whole face of the implement, including the blade or rib, being rounded or convexed in the direction of its length, substantially as herein described.

5. A tool or implement for marking and dressing the joints of cement pavements and surfaces, consisting of the angled pieces $a$, the blade or rib B, and the handled shank $d$, both blade and shank being clamped between the angled pieces, substantially as herein described.

6. A tool or implement for marking and dressing the joints of cement pavements and surfaces, consisting of the angled pieces $a$, having laterally-concaved faces, the V-shaped blade or rib B, clamped between the angled pieces and projecting below their faces, and the handled shank $d$, clamped between said pieces, substantially as herein described.

7. A tool or implement for marking and dressing the joints of cement pavements and surfaces, consisting of the angled pieces $a$, having laterally-concaved and longitudinally-convexed faces, the V-shaped curved blade or rib B, having concaved sides and clamped between the pieces $a$, and the handle D and the shank $d$, bolted between said pieces, substantially as described.

In witness whereof I have hereunto set my hand.

MALCOM MACDONALD.

Witnesses:
S. H. NOURSE,
H. C. LEE.